(12) United States Patent
Polis et al.

(10) Patent No.: US 6,531,209 B2
(45) Date of Patent: Mar. 11, 2003

(54) SUSPENSION ADHESIVE FOR BONDING AND SEALING COMPONENTS IN A LIGHT SOURCE

(75) Inventors: Daniel Polis, Cleveland Heights, OH (US); Vishal Gauri, Lyndhurst, OH (US)

(73) Assignee: General Electric Company, Schenectady, NY (US)

( * ) Notice: Subject to any disclaimer, the term of this patent is extended or adjusted under 35 U.S.C. 154(b) by 42 days.

(21) Appl. No.: 09/728,722

(22) Filed: Dec. 1, 2000

(65) Prior Publication Data

US 2002/0066519 A1 Jun. 6, 2002

(51) Int. Cl.[7] .............................. B32B 5/02; B32B 5/16; B32B 5/22; B32B 5/30; B32B 7/00
(52) U.S. Cl. ...................... 428/212; 428/218; 156/62.2; 156/89; 156/275.7; 156/325; 156/326; 156/327; 264/603; 264/614; 264/621; 264/669; 264/670; 313/358; 277/590; 277/628; 277/650
(58) Field of Search ................................ 428/212, 218, 428/304.4; 156/325, 326, 327, 89; 75/228, 230; 419/2, 5, 10, 19, 61, 65; 313/358; 264/603, 614, 621, 669, 670; 277/590, 628, 650

(56) References Cited

U.S. PATENT DOCUMENTS

| 4,861,410 A | 8/1989 | Clark et al. |
| 4,978,410 A | 12/1990 | Clark et al. |
| 5,516,388 A | 5/1996 | Moran et al. |
| 6,033,788 A | 3/2000 | Cawley et al. |

FOREIGN PATENT DOCUMENTS

| JP | 63-206409 A | * | 8/1988 |
| JP | 02-149475 A | * | 6/1990 |
| JP | 06-191959 A | * | 7/1994 |
| JP | 08-246006 A | * | 9/1996 |

\* cited by examiner

Primary Examiner—Vivian Chen
(74) Attorney, Agent, or Firm—Fay, Sharpe, Fagan, Minnich & McKee, LLP

(57) ABSTRACT

A suspension adhesive comprised of a matrix material and a particulate filler material is useful for bonding, sealing, repairing, and modifying ceramic, glass, and powdered metal components in a light source. A method for making the suspension adhesive includes the selection of a filler material and a volume percentage of the filler material. Additionally, a matrix material is selected and the filler material is dispersed throughout the matrix material. The suspension adhesive is used to bond and seal components to form, for example, an arc tube for a light source.

4 Claims, 7 Drawing Sheets

SUSPENSION ADHESIVE FOR BONDING AND SEALING COMPONENTS IN A LIGHT SOURCE

BACKGROUND OF THE INVENTION

1. Field of the Invention

The present invention relates to the art of powder processing of ceramic, glass, or metal articles or component assemblies, and the resultant articles formed thereby. The invention finds particular application in light sources and a process for manufacturing light sources, for example, for manufacturing arctubes used in metal halide lamps. However, the invention is equally applicable to the manufacture of other glass and ceramic articles, as well as to powder metallurgy processes.

2. Discussion of the Art

In powder processing, shaping an article or component is often mediated through the presence of a carrier fluid, which can be a water-based solution, mixture of organic liquids, or molten polymers. Ceramic, glass, and metal powders can be processed with equal facility. The mixture is made to emulate a liquid; a plastic, or a rigid solid by controlling the type and amount of carrier and the conditions (e.g., ambient temperature). The result of the shaping process is a "green" (i.e., unfired) powder compact that is a solid, but has an internal structure that includes discrete powder particles held together by a binder (usually a component of the carrier fluid). The powder compact is converted to a dense solid (and the microstructure is developed) through subsequent thermal processing to burn out, or pyrolize, the organic phase and densify, or sinter, the inorganic powder. An alternative method for densifying the compact is through thermal processing to eliminate the binder and develop a modest amount of bisque strength followed by infiltration with a melt of a less refractory material. Both sintering and infiltration can be used with equal facility for powder ceramics glasses and metals.

Assemblies are made by joining or bonding two or more manufacturable compacts or components together. It is common to hermetically seal ceramics, e.g., ceramic metal halide arc tubes, with either seal glass or shrinkage fits between the arc tube components (body and plug). The bisque-fired components are typically assembled prior to sintering so that the sintering step binds the components together. The densities of the bisque-fired, first and second components are selected to achieve different degrees of shrinkage during the sintering step. . One known method of bonding powder processed components is described in commonly assigned, published application EP 0 954 011 A1.

Again, by way of example, current two part ceramic metal halide arc tube designs undergo two different presintering cycles in order to join two components with the same solids loading. This can cause complications for optical transmissions. Moreover, it is not uncommon that polishing is subsequently required with shrinkage fits to remove surface defects.

In summary, each of these available techniques has disadvantages and in many cases a required complex shape cannot be made by the available methods. Relying on relative shrink rates in order to form bonds is an exacting art that does not easily lend itself to design alteration and adaptation. Any change in material due to, for example, drifts in production tolerances or changes in suppliers can lead to poor quality components. For example, components can engage too soon in the process and lead to distortion in the final assembly or too late in the process whereby an inadequate seal is formed between the components. Furthermore, designs cannot simply be scaled up and down as required for larger or smaller components. Instead changes must be carefully engineered to determine the impact scaling has on gap sizes and gap closure rates. Additionally, imprecision in the shrink fit process often creates surface defects in shrink fit components. Therefore, shrink fit components often require an additional polishing step.

Other techniques require extra processing steps. For example, glass frits must be properly placed and melted—an expensive and time-consuming process. Additional processing steps, in turn, require extra processing equipment and floor space. Furthermore, processes that require extra pre-sintering cycles can cause complications for optical transmission.

For the foregoing reasons, a technique for joining or bonding green ceramic components with the same filler loading and therefore the same shrink rates is needed to provide increased design flexibility. Additionally, a technique that reduces the number of processing steps required to make an assembly of components is always desirable and particularly a technique that lends itself to rapid prototyping of new designs.

BRIEF SUMMARY OF THE INVENTION

A suspension adhesive is provided to bond, seal or repair compacts or components. The suspension adhesive comprises a matrix having a melting point and/or glass transition temperature below room temperature, and matching particulate filler. The particulate filler is dispersed through the matrix in a volume fraction substantially matching the volume fraction of the particulate filler associated with the components.

Additionally, a method for bonding, sealing, repairing or modifying components comprised of particulate filler has been developed. The method comprises the steps of combining an organic matrix with an amount of the particulate filler, forming a suspension adhesive having a volume fraction of particulate filler, substantially matching a volume fraction of particulate filler found in the components, applying an appropriate amount of the suspension adhesive to at least one surface of the components, treating the components to remove binder material associated with the components and to remove the organic matrix, and sintering the components to bond, seal, or repair the components.

A formulation of a low molecular weight polymer or oligomer based binder of a rubbery nature is sued in another embodiment of the invention. A ceramic powder having substantially the same concentration as the green or presintered ceramic parts to be joined is suspended in the binder with an optional dispersant and a high molecular weight additive. The oligomeric polymer in the suspension allows for desired rheological and thermal properties leading to high quality seals.

The adhesive and method for bonding, sealing, repairing or modifying components is used to make a light source. The light source comprises a first component and a second component bound thereto with a suspension adhesive to form an initial assembly. The initial assembly is treated to remove any binder or organic matrix from the initial assembly. The components and adhesive are subsequently sintered to form the component assembly.

One advantage of the present invention resides in the ability to rapidly prototype new designs.

Another advantage of the present invention stems from an ability to produce new assemblies or parts in low volume without incurring prohibitive tooling costs.

Yet another advantage of the present invention is found in a reduced number of production steps, reducing production time, resources and cost.

A further advantage of the present invention is improved product quality and yield resulting from a reduction in product handling and temperature cycling.

DETAILED DESCRIPTION OF THE INVENTION

Figure 1:
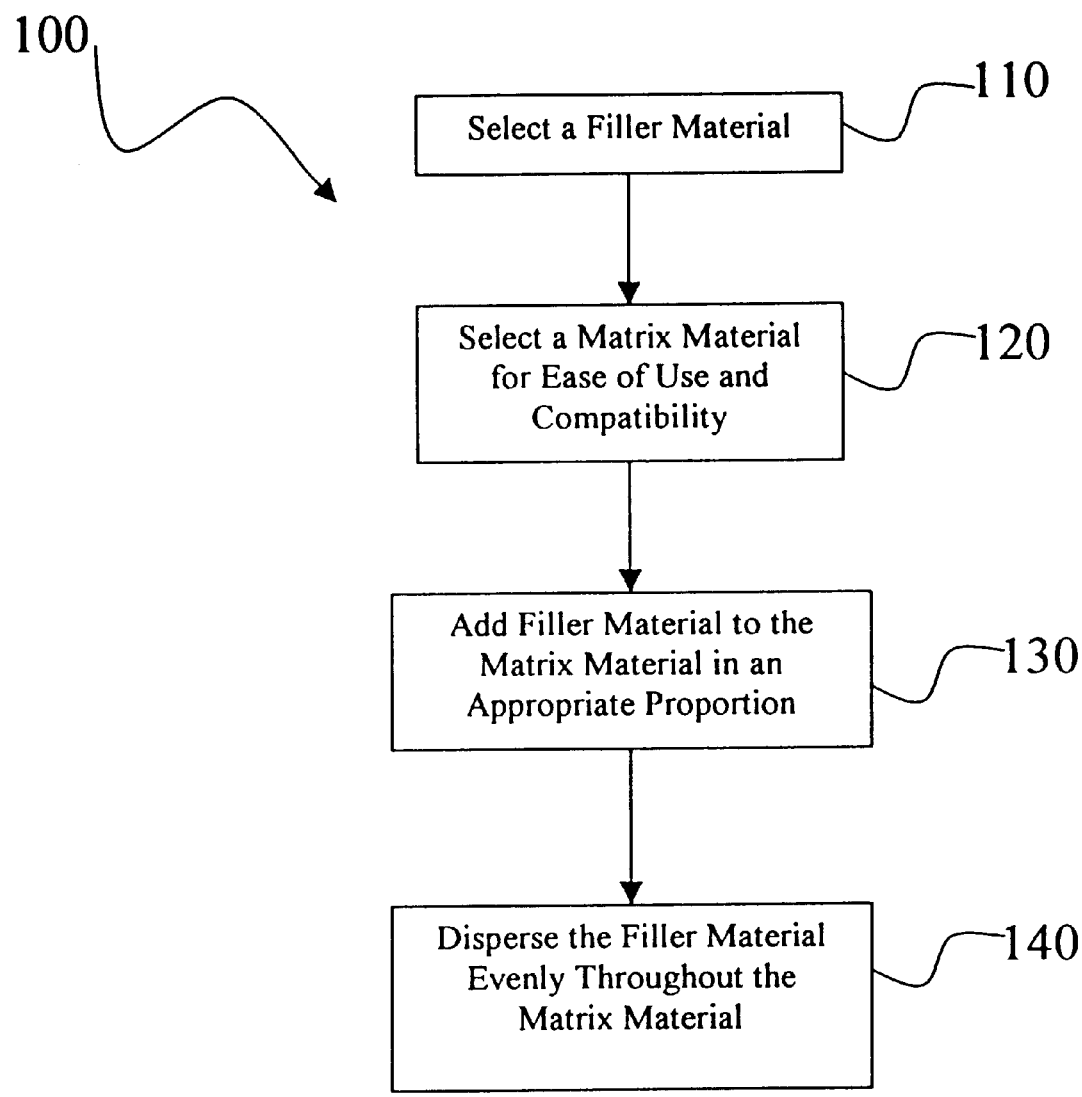
FIG. 1 is a flow diagram outlining a process for making a suspension adhesive useful for bonding, sealing, repairing and modifying components.

Referring to FIG. 1, a process for making a suspension adhesive 100 for bonding, sealing, repairing, and modifying compacts or components begins with a filler material selecting step 110. Preferably the filler material is selected to match the filler material used in the components. Alternatively, the filler material is selected to be compatible with the filler material of the components. For example, the filler material used in the adhesive should have crystallographic properties that are, at least to some degree, compatible with the crystallographic properties of the components. A compatible crystallography allows the filler material of the adhesive and the filler material of the components to, at least some degree, fuse together during a subsequent sintering step or the like.

In a matrix material selecting step 120, a matrix material is selected. Preferably the matrix material is selected for the material's ease of use and for the compatibility of the material with both the filler material of the adhesive and a binder material used in the components. Here, compatibility is generally related to a similarity between surface energies of the materials involved. Preferably, the matrix material has a surface energy that closely matches the surface energy of the filler material of the adhesive. Furthermore, preferably, the surface energy of the matrix material is also similar to that of the binder material of the components. In general if a matrix material is compatible with the filler material it is also compatible with the binder. This is because a good binder is compatible with the filler material of the component and the filler material of the adhesive is selected to be the same as, or compatible with, the filler material of the component.

It is understood, however, that in some cases compatible materials are not available. In those cases, surface acting or wetting materials can be added to the matrix. Surface acting materials change the surface energy of one or more of the materials in the adhesive in order to make the matrix material more compatible with one or more of the filler materials of the adhesive and the binder material of the components.

In a material combining step 130, the selected filler material is added to the selected matrix material. Preferably the filler material is added to the matrix material in the same volume proportion that filler material is present in the components. However, where two dissimilar components are to be bonded, a different amount of filler material may be used. Where two dissimilar components are to be bonded, filler material can be added to the matrix in a proportion that is, for example, an intermediate value between the volume proportion of filler material in the first component and the volume proportion of filler material in the second component.

After and/or while the filler material is added to the matrix material, the two materials are mixed together in a filler material dispersing step 140. Preferably the materials are selected to be workable at room temperature and pressure. Some embodiments are very viscous. Therefore, thorough dispersion of the filler material throughout the matrix material may require the use of power driven mixing equipment.

Figure 2:
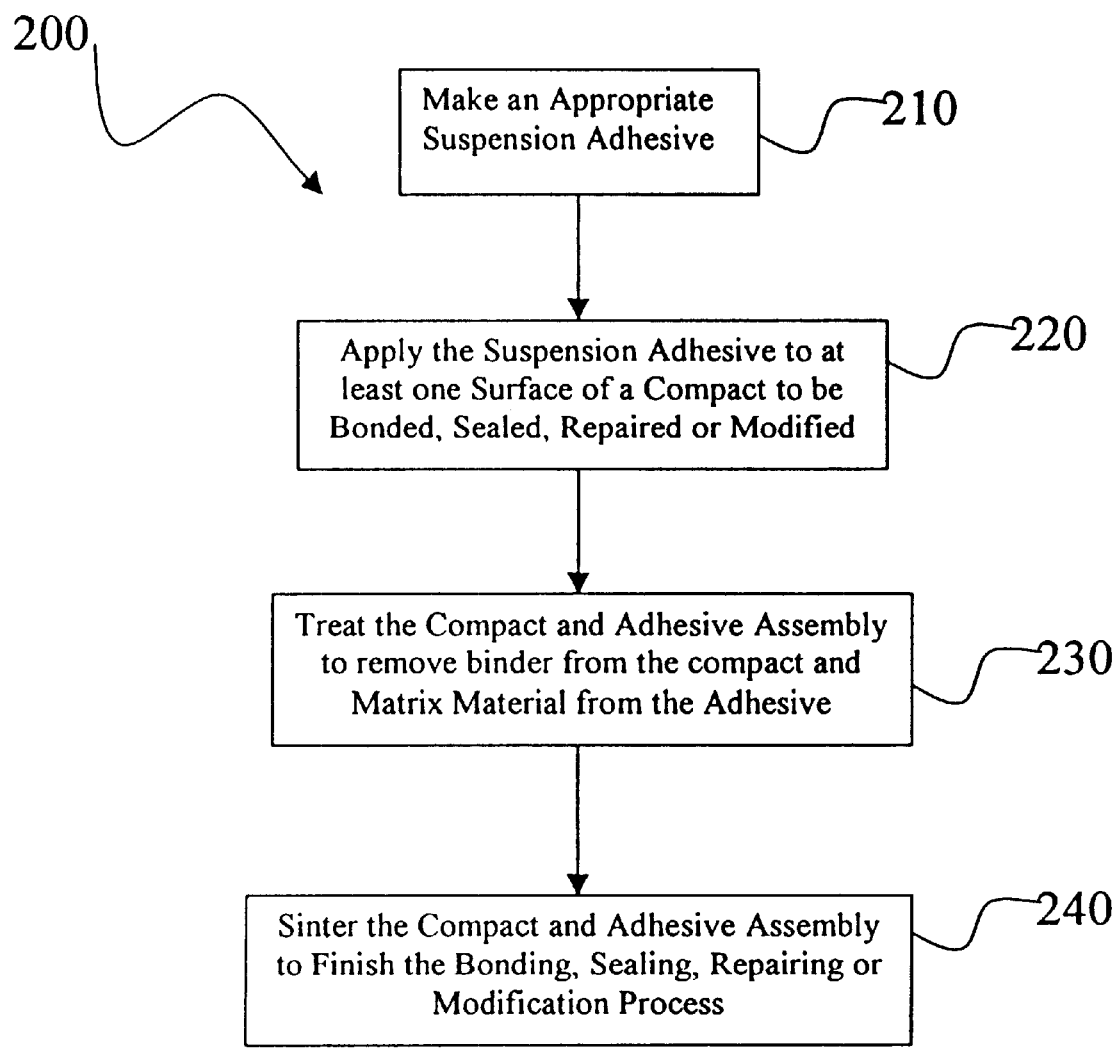
FIG. 2 is a flow diagram outlining a process for bonding, sealing, repairing and modifying components.

Referring to FIG. 2, a process for bonding, sealing, repairing or modifying one or more components 200 includes an adhesive manufacturing step 210. Preferably the general process for making a suspension adhesive 100 is followed. For example, in the manufacture of an arc discharge lamp the filler material of green compacts used to make an arc tube envelope is often $Al_2O_3$. A binder material used in the compacts is often wax. Typically such compacts range from about twenty to seventy volume percent, and more particularly between fifty and sixty volume percent, $Al_2O_3$ filler material and the remaining volume percent is a wax. An appropriate suspension adhesive uses $Al_2O_3$ filler material with an oleic acid. The $Al_2O_3$ filler preferably matches the filler material and the oleic acid is compatible with both the $Al_2O_3$ filler of the adhesive and the wax used as the binder in the green parts. Other materials and other proportions are anticipated. For example, filler material volume proportions ranging from about forty to about sixty percent are common. In the lighting industry, common filler materials include densifiable ceramics such as, for example, alumina, YAG, zirconia, silicon carbide, and aluminum nitride. This list is not intended to be exhaustive since other materials can be used as well. In the manufacture of stainless steel parts, compacts made from stainless steel filler material and polymer binders can be bonded, sealed, repaired or modified using a suspension adhesive appropriate to those materials. For example a suspension adhesive comprised of 316L stainless steel powder and oleic acid is appropriate for bonding, sealing, repairing and modifying compacts made of 316L stainless steel and a binder comprising a high percentage on the order of about ninety percent polyacetal and a low percentage on the order of ten percent polyethylene-polypropylene copolymer.

The adhesive is applied to at least one component in an adhesive application step 220. The adhesive is applied in any known manner for the application of pastes and adhesives. The adhesive can be spread, brushed, sprayed or extruded onto a compact. Where the adhesive is used to fill a relatively deep crack or void in a component, for example, it may be preferred to apply the adhesive by extruding it though a needle or like device. Extrusion may also be appropriate when using the adhesive to add structural details to a component, for example, during the process of rapid prototyping. New part designs can be investigated without spending the time and money required to manufacture new molds, dies and the like. Where a wide shallow void in a component is to be repaired, it may be easier to spread or brush the adhesive into the imperfection. Since the adhesive is well matched to the component, then the void or imperfection will be filled to match the appearance of a defect free component. Shrink rates of a component and a well-matched adhesive will be the same. Therefore, during subsequent treatment and sintering, the component and the adhesive will change size in a proportional manner.

Where components are to be bonded together adhesive is applied to one or both of the components. The components are then brought into close proximity so that a layer of adhesive on the first part comes into close contact with the second part or with the layer of adhesive on the second part. Suspension adhesives made according to the process 100 described above can be made to flow at room temperature by the application of pressure. Preferably, such adhesives will not flow under the weight of the adhesive (even when applied in thicknesses of one millimeter or more) or even under the additional weight of components to be bonded. Therefore, the adhesive is usually all that is required to hold the components in position during subsequent processing. However, it is understood that in some circumstances a jig or other support may be required to prevent one component from shifting with respect to the other component.

The remaining steps in the process 200 are similar to steps in conventional compact processing. That is, treating step 230 removes the binder from the components. The same treating step also removes the matrix material from the adhesive. Typically, this step is a thermal treatment where the components with the adhesive are heated to an elevated temperature, for example, about 390° C. At the elevated temperature the binder and matrix are removed and the components are joined. The filler particles from both the compact and adhesive are held together by cohesive forces. Other methods and treatments can be used as an alternative to the thermal processing such as solvent extraction, chemical action, etching, etc.

The last step in the preferred process for bonding, sealing, repairing or modifying compacts 200 is a sintering step 240. The temperature of the cohesive compact and adhesive filler material is slowly raised to, for example, 1850° C. and the filler material particles fuse together to create a completed homogeneous part.

Figure 3:
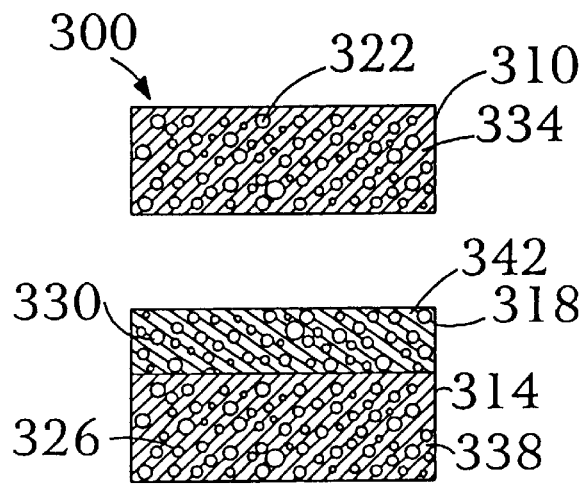
FIGS. 3–6 are highly magnified sectional diagrams showing two components as bonded, sealed, repaired and/or modified with a suspension adhesive according to the method of FIG. 2.

Referring to FIG. 3, in a first highly magnified view 300 of a first component 310, a second component 314, and a suspension adhesive layer 318, filler material particles 322, 326, 330 are seen dispersed throughout first and second binder materials 334, 338 and throughout a matrix material 342 respectively. Component filler material particles 322, 326 are comprised of the same material such as, for example, alumina. Likewise, the adhesive filler material particles 330 are also chosen to be alumina. As described above, the first 334 and second 338 binder materials can be any known compatible binder material such as wax and the matrix material 342 can be any compatible matrix material, such as for example oleic acid.

The suspension adhesive layer 318 is applied to one of the components, here the second compact 314. The first component 310 is not yet in contact with the suspension adhesive layer 318. The binder materials 334, 338 adhere to the filler material 322, 326 because it is selected to have a compatible surface energy with that of the filler material. Likewise, the matrix material 342 is selected to adhere to both the adhesive filler material 330 and the binder materials 334, 338. In some cases additives may be required to treat the surfaces of, for example, the filler material 330 in order to make the surfaces compatible with the binder 334, 338 and matrix 342 materials.

Figure 4:
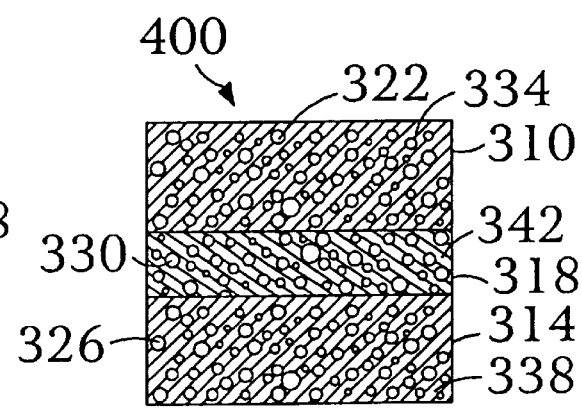

Referring to FIG. 4, a second highly magnified view 400 of the first component 310, the second component 314 and a suspension adhesive layer 318 shows the components 310, 314, 318 sandwiched together. The suspension adhesive layer 318 is wetted and adhered to a surface of the first component 310 and the assembly of components is ready for treatment to remove the binder 334, 338, and matrix material 342.

Figure 5:
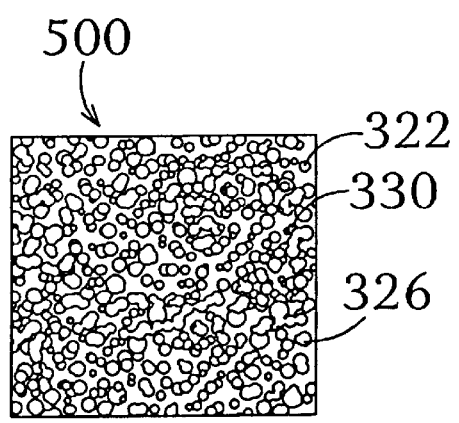

Referring to FIG. 5, a third highly magnified view 500 shows the filler material particles 322, 326 of the first and second components, as well as the filler material particles 330 of the adhesive after the treating step that removes the binder and matrix. During the treatment, the filler material particles 322, 326, 330 of the components and adhesive migrate together (thus accounting for some shrinkage of the overall assembly). The migration brings the filler material particles into close contact. A large surface area to mass ratio associated with the filler material particles allows them to be held together by cohesive forces. In this state, the filler material particles 322, 326 of the components and the filler material particles 330 of the adhesive are substantially indistinguishable. The assembly is now ready for sintering by known processes.

Figure 6:
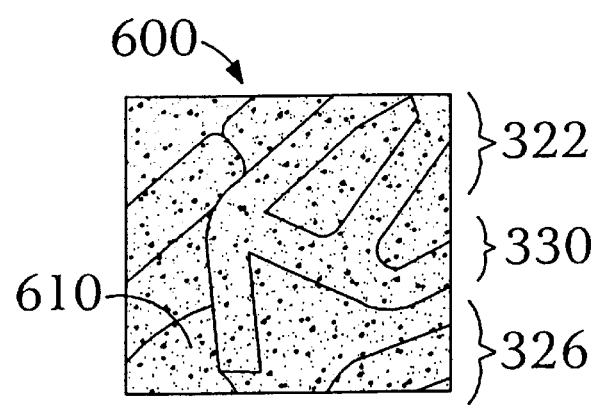

The view 600 of FIG. 6 shows the filler material after sintering. The filler material particles 322, 326, 330 of FIG. 5 have coalesced and formed relatively large interlinked crystals 610. The component filler material and the adhesive filler material remain indistinguishable and have formed a single solid part.

It will be recognized that the present invention is applicable to joining components having a different volume percentage of filler material particles dispersed through the first component than the second component. To accommodate this situation, the volume percentage of filler material in the suspension adhesive is chosen to be an intermediate percentage between the volume percentages of the filler materials in the first and second components. The differences in filler material density become less apparent in each processing stage. The adhesive acts as a buffer or transition region between the different densities of the two components. Of course, it will be appreciated that the adhesive can be used to join more than two components at a time.

Figure 7:
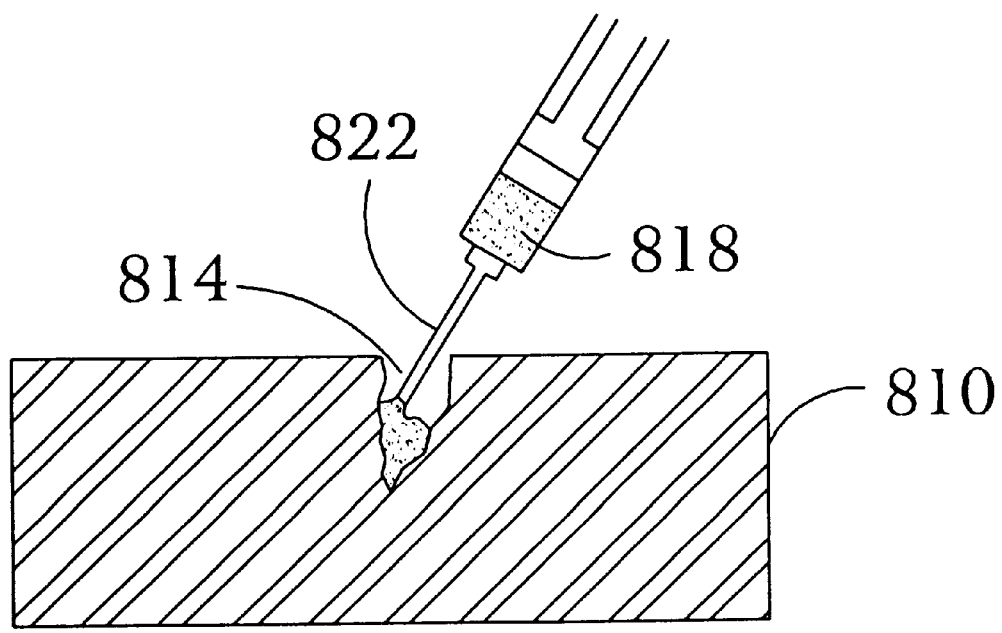
FIG. 7 is a sectional diagram showing a component with a deep narrow defect being repaired according to the method of FIG. 2.

Referring to FIG. 7, a component 810 comprised of a particulate filler material has a deep narrow crack or imperfection 814. A suspension adhesive 818 comprising a matrix material and particulate filler is extruded through a needle 822 into the imperfection 814 in order to repair the imperfection 814. In accordance with the present invention, the particulate filler of the suspension adhesive 818 is compatible with the particulate filler of the component 810 so that crystals of the two materials can form in connected or interlocking fashion. The surface energy of the matrix material is comparable to the surface energy of the binder material so that adhesive forces between the binder and matrix materials hold the adhesive to the binder. When the imperfection is filled with adhesive and the surface of the imperfection is transitioned with the rest of the surface of the component, the component is treated as described in relation to FIGS. 4, 5 and 6. The result is a completed part showing no significant sign of the imperfection.

Figure 8:
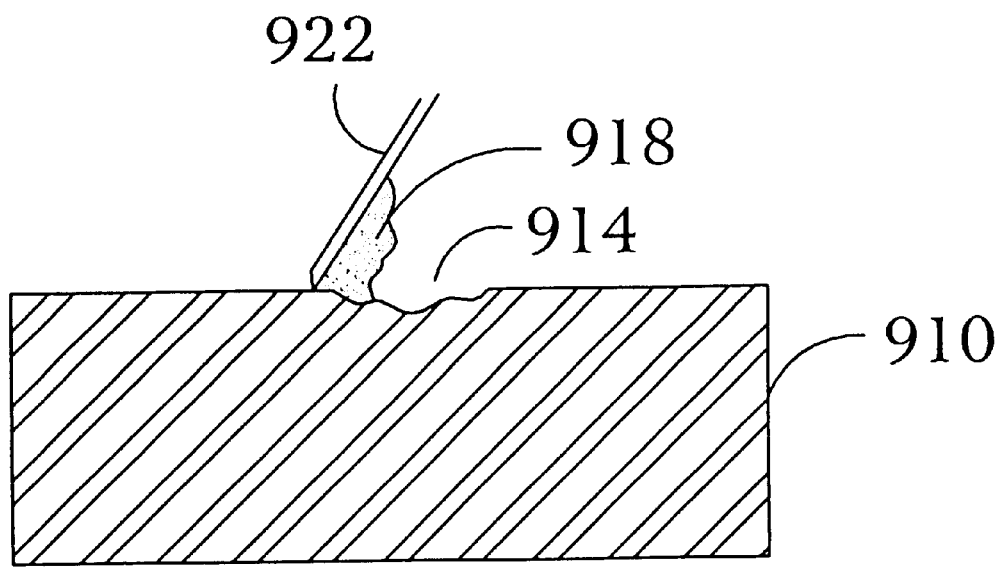
FIG. 8 is a sectional diagram showing a component with a wide shallow defect being repaired according to the method of FIG. 2.

Referring to FIG. 8, a component 910 comprised of a particulate filler material has a wide shallow void or imperfection 914. Again, a suspension adhesive 918 comprising a matrix material and particulate filler is spread with a tool 922 into the imperfection 914. The particulate filler of the suspension adhesive 918 is compatible with the particulate filler of the component 910.

Figure 9:
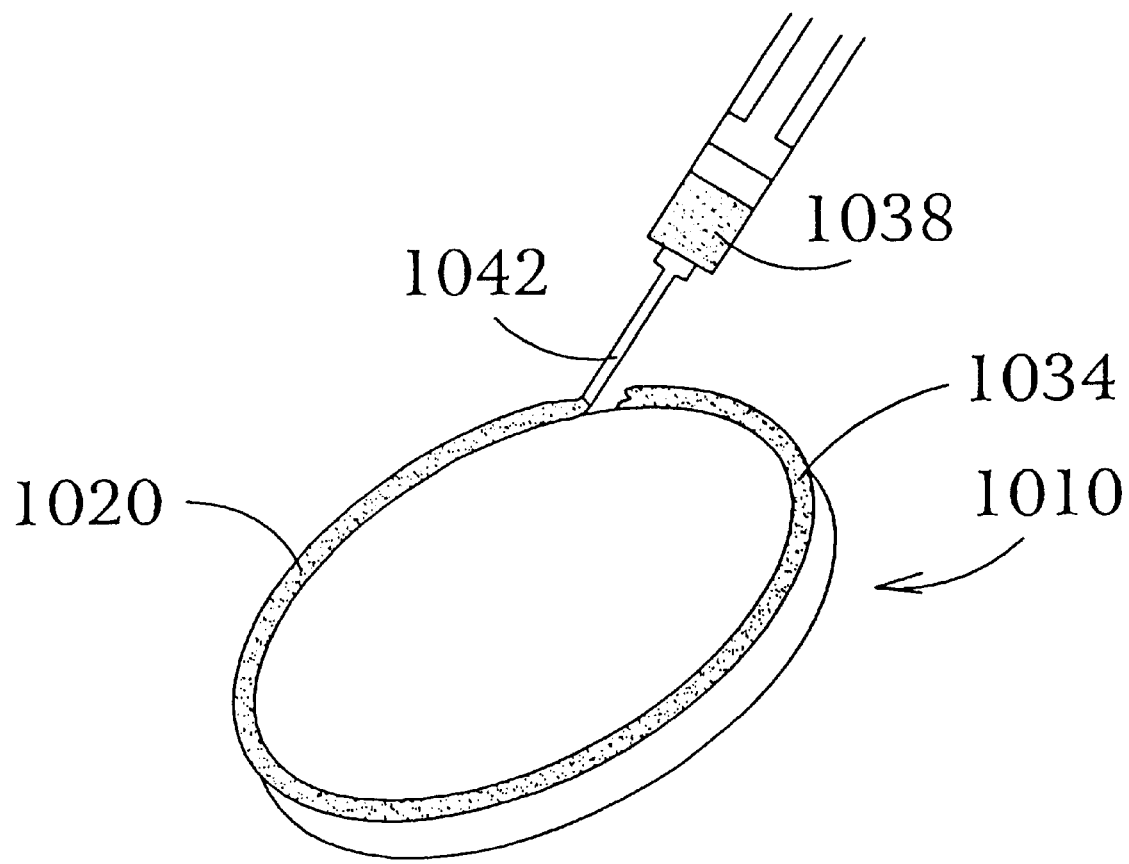
FIG. 9 is a schematic diagram showing a component being modified according to the method of FIG. 2.

Referring to FIG. 9, a first component in the shape of a disk 1010 is modified by the application of adhesive 1020 in order to rapidly prototype a new component design. For example, where it is desired to test the usefulness of a component in the shape of a disk with an annular lip or rim, and where a component in the shape of a disk 1010 is available, a lip or rim 1034 is added to the disk. The lip 1034 is added by, for example, extruding a compatible suspension adhesive 1038 through a needle 1042 ,or other tool or die, onto the disk shaped component. After the modification is complete the modified component is treated and sintered as described in reference to FIGS. 4, 5 and 6.

An effective sealing suspension includes the properties of an effective, strong adhesive nature and elastic rheology. Among these properties are high extensional viscosity, low vapor pressure at room temperature and burnout temperatures that are compatible with the binder in the green ceramics for maximum, interpenetration, and reduced thermal stresses. These properties are advantageously achieved with an oligomeric polymer that is preferably liquid at room temperatures. An exemplary oligomeric polymer based adhesive or sealing suspension that demonstrates improvements in comparison to other liquid hydrocarbon based systems is a polybutene oligomer having a moledular weight of approximately 500. The adhesive suspension includes approximately 15% polybutene oligomer, approximately 84% ceramic powder, and approximately 1% stearic acid by weight. Injection molded green ceramic parts have been successfully joined using a paraffin wax binder system in a suspension matched adhesive that includes the ceramic powder suspended in an oligomeric polymer. The adhesive nature of the rubbery oligomer with molecular weights ranging from about 200–1500 increases green joint strength. The higher viscosity and increased yield stress of the suspension provide increased stability and increase the gap over which sealing can be achieved. Moreover, the low vapor pressure of the oligomer ensures the life of the suspension and prevents problems due to drying in ambient conditions. Preferably, the oligomer is selected such that the vaporization temperature is close to that of paraffin wax, or whatever binder is used in the forming process. It will also be appreciated that a variety of dispersants can be included in the formulation to suspend different ceramic powders. In addition, a higher molecular weight rubbery polymer can be dissolved in the ligomer to provide desired elastic properties that are enhanced by over an order of magnitude. An example would be polyisobutylene having a molecular weight on the order of 100,000 at a weight ratio of 0.2% to the amount of the oligomeric polybutene.

Referring to FIGS. 10–13, a light source is manufactured from a first component or plug 1110 and a second component or body 1120 bound together with a suspension adhesive 1130. The assembled components form an arc tube envelope 1140. The plugs 1110 are relatively thick disks 1144 having legs 1148 projecting from outer surfaces 1152. The body 1120 is preferably formed as a cylinder having open ends 1156. The inner diameter of the body is larger than an outer diameter of the plugs so that gaps 1168 are formed between outer edges 1172 of the disks and the inner surface of cylinder wall 1176 upon insertion of the plugs into the open ends of the body. The gaps 1168 are on the order of, for example, approximately one millimeter.

Figures 10, 11, 12, 13:
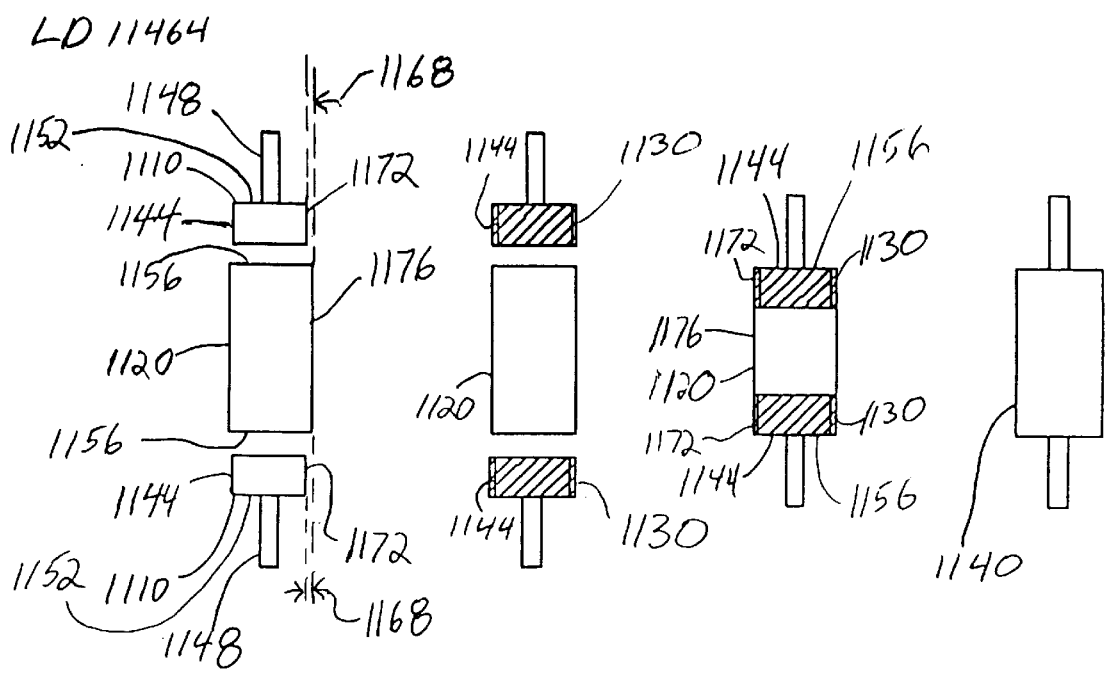
FIG. 10–FIG. 13 are sectional views of components being bonded together to form an arc tube envelope according to the method of FIG. 2.
Figure 14:
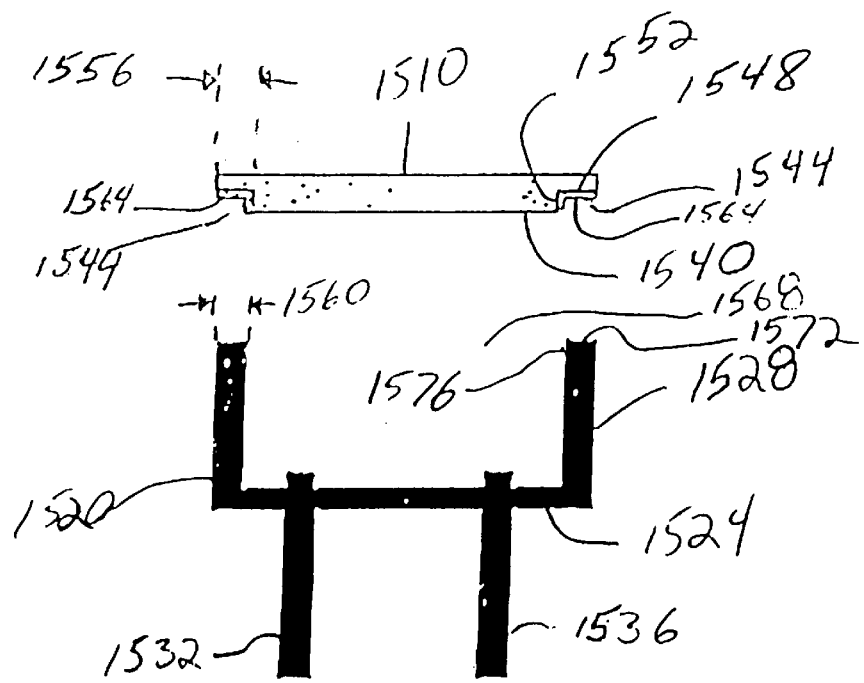
FIG. 14 is a sectional view showing components prepared to be bonded together to form a different kind of arc tube according to the method of FIG. 2.

As shown in FIG. 12, the suspension adhesive 1130 is applied to the outer edge surface 1172 of the disks 1144. The adhesive is applied with sufficient thickness to close and seal the gaps 1168 completely. Thus, the adhesive layer is approximately one millimeter thick. The plug is coaxially installed within the open ends 1156 of the body 1120 (FIG. 12). The adhesive layer 1130 adheres to the outer edge of the plugs and to an adjacent inner surface portion of the cylinder wall 1176. Therefore, the arc tube assembly is prepared for treatment and sintering as described in reference to FIGS. 4, 5 and 6. Sintering produces a solid uniform arc tube envelope 1140 as shown in FIG. 13.

Where the invention is used to make arc tubes, it is not restricted to the manufacture of double ended arc tubes or arc tube envelopes such as those depicted in FIGS. 10–13. For example, FIG. 14 illustrates a plug 1510 and a body 1520 used to assemble a single ended arc discharge tube. The body 1520 is cup or bowl shaped having a generally planar surface 1524 and a continuous circular sidewall 1528 extending outwardly therefrom. First and second legs 1532 ,1536 are spaced from one another and extend through the planar surface 1524 to support first and second electrodes (not shown) that extend into the body. The plug 1510 has an outer diameter that is substantially the same as an outer diameter of the continuous sidewall of the body. A shoulder 1544 is formed along a perimeter of the plug by a first wall 1548 and a second wall 1552 disposed in a stepped configuration having a radial dimension 1556 that is slightly greater than a thickness 1560 of the body sidewall. The shoulder walls 1548, 1552 are preferably coated with a layer of suspension adhesive 1564 and the plug positioned over an open end 1568 of the body. The adhesive1564 on the shoulder contacts and adheres to a top edge 1572 of the continuous sidewall and along a portion of an inner surface of the continuous sidewall 1528 to form a bond and seal between the arc tube components before treatment and sintering in a manner as described in reference to FIGS. 4, 5 and 6.

Figure 15:
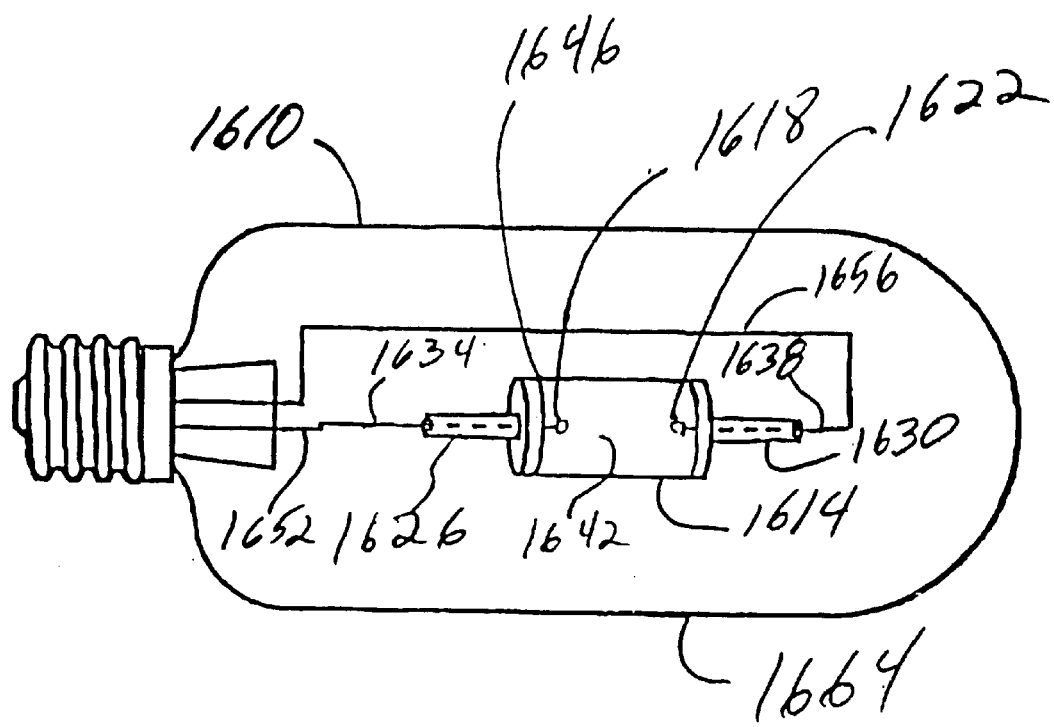
FIG. 15 is a sectional view of a light source comprising a component made according to the method of FIG. 2.

FIG. 15 illustrates a light source 1610 that incorporates an arc tube 1614 formed according to the above described method. Preferably, the arc tube has a substantially uniform density provided by the uniform solids loading of the components. First and second electrode assemblies 1618, 1622 extend through first and second envelope legs 1626, 1630, respectively, and are connected to first and second outer leads 1634, 1638. A conventional fill 1642 is sealed within the arc tube, for example, by melting a glass frit about the outer leads in the legs 1626, 1630 and the fill is selectively energized to emit light. An outer vitreous envelope 1664 surrounds the arc tube 1646 and leads 1634, 1638, 1652, 1656.

The invention has been described with reference to the exemplary embodiments. Modifications and alterations will occur to others upon reading and understanding the specification. For example, embodiments of the adhesive can be used to bond, seal, repair and modify components comprised of powdered metals as well as other ceramics and glasses. Electrodes and electrode leads can be installed during the formation of the components, thereby eliminating an assembly and sealing step. Fill gas can be added to the arc tube at a different point in the assembly process. Components for devices other than light sources can be made using the present invention. Joining two or more green ceramic parts is improved by allowing for one furnace cycle, reduced handling, and eliminating the need to polish while still providing an optical quality joint. In other instances, the subject invention eliminates the need for commonly used seal glass, thus providing a higher service temperature and its attendant benefits and advantages. The invention is intended to include such modifications and alterations insofar as they come within the scope of the appended claims or the equivalents thereof.

What is claimed is:

1. A light source comprising:
    a first green component having a first volume fraction of solids;
    a second green component having a second volume fraction of solids; and
    a suspension adhesive interconnecting the first and second components, the adhesive having an organic matrix and a particulate filler, the particulate filler having a volume fraction that is intermediate the first and second volume fraction of solids.

2. The light source of claim 1 wherein the particulate filler has a volume fraction of solids that is substantially identical to the volume fraction of solids of one of the first and second components.

3. The light source of claim 1 wherein the volume fraction of solids of the suspension adhesive is a ceramic powder suspended in an oligomeric polymer of a rubbery nature.

4. The light source of claim 3 wherein the green components further comprise a binder wherein the oligomeric polymer is selected to have a vaporization temperature approximating that of the binder.

* * * * *